United States Patent [19]

Leibinger et al.

[11] Patent Number: 4,775,135

[45] Date of Patent: * Oct. 4, 1988

[54] APPARATUS AND METHOD FOR CLAMPING AND POSITIONING WORKPIECE IN MACHINE TOOLS

[75] Inventors: Berthold Leibinger, Gerlingen; Eugen Herb, Ditzingen, both of Fed. Rep. of Germany

[73] Assignee: Trumpf GmbH & Co., Ditzingen, Fed. Rep. of Germany

[*] Notice: The portion of the term of this patent subsequent to Oct. 28, 2003 has been disclaimed.

[21] Appl. No.: 909,262

[22] Filed: Sep. 19, 1986

Related U.S. Application Data

[63] Continuation-in-part of Ser. No. 474,438, Mar. 11, 1983, Pat. No. 4,619,448.

[51] Int. Cl.⁴ .................................................. B23Q 3/00
[52] U.S. Cl. .................................. 269/303; 269/118; 269/244; 269/305; 269/320
[58] Field of Search ................. 269/32, 91, 93, 94, 269/111, 118, 119, 120, 216, 244, 257, 289 MR, 303–305, 320, 58, 63

[56] References Cited

U.S. PATENT DOCUMENTS

| 751,723 | 2/1904 | Doolittle . | |
|---|---|---|---|
| 866,782 | 9/1907 | Geisendorfer . | |
| 1,342,891 | 6/1920 | Bergstrom . | |
| 3,198,515 | 8/1965 | Pitney | 271/26 |
| 3,411,829 | 11/1968 | Albright | 302/29 |
| 3,593,984 | 7/1971 | Carman . | |
| 3,722,062 | 3/1973 | Gharaibeh . | |
| 3,816,904 | 6/1974 | Herb . | |
| 3,825,250 | 7/1974 | Miller | 271/59 |
| 3,967,817 | 7/1976 | McClocklin . | |
| 4,274,801 | 1/1981 | Herb et al. . | |
| 4,386,770 | 6/1983 | Hellin | 271/18.3 |
| 4,397,460 | 8/1983 | Milanes | 271/263 |
| 4,412,469 | 11/1983 | Hirata et al. . | |
| 4,523,749 | 6/1985 | Kindgren et al. | 269/58 |

Primary Examiner—Frederick R. Schmidt
Assistant Examiner—Judy J. Hartman

[57] ABSTRACT

A machine tool employs a workpiece guidance system comprising a pair of guide assemblies each including a stop member movable along one of the X and Y axes and a clamping element for clamping the workpiece in the stop member for movement therewith. The clamping element is movable independently of its associated stop member as well as therewith, and one stop member will provide a guide surface for the workpiece as it is moved past it by the other guide assembly. In one embodiment, the clamping element is a claw or clamp in a fixed position on the stop member and which is automatically actuable to clamp the workpiece or to release the workpiece for guided movement thereby. In another, the clamp is slidably supported in the stop member for movement relative to a base element to provide clamped guiding movement for the workpiece and also can be locked in a position to fix the workpiece therefor. The machine tool also includes a computer control system for operating the motors which drive the guide assemblies and for operating the hydraulic mechanisms.

15 Claims, 4 Drawing Sheets

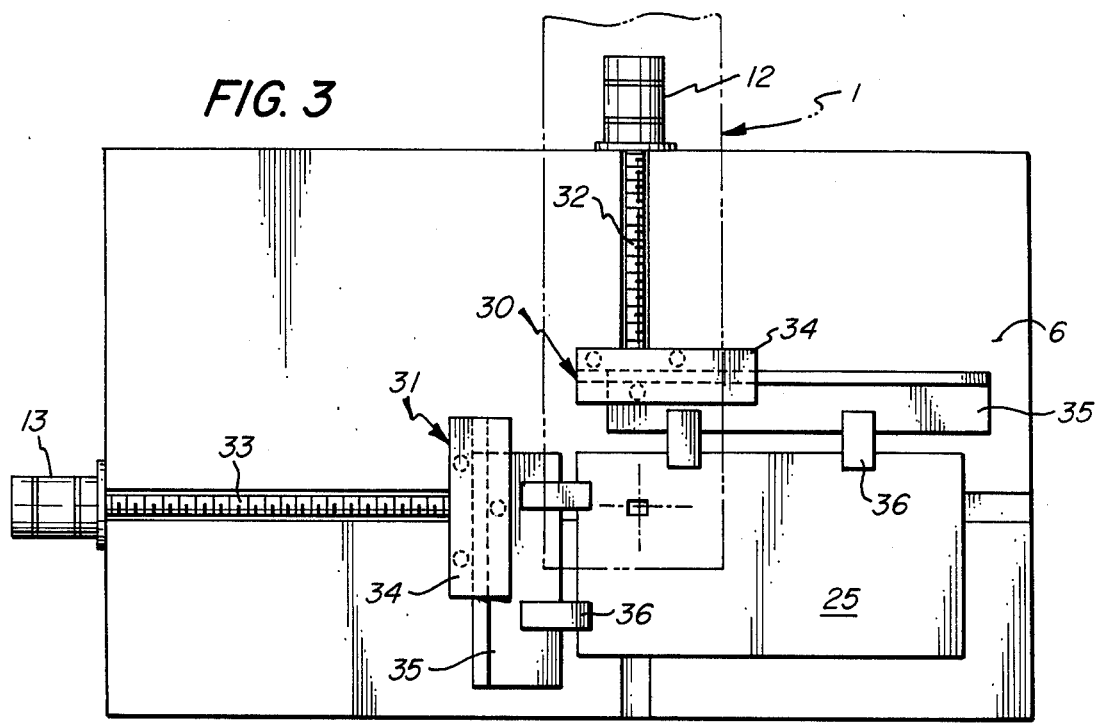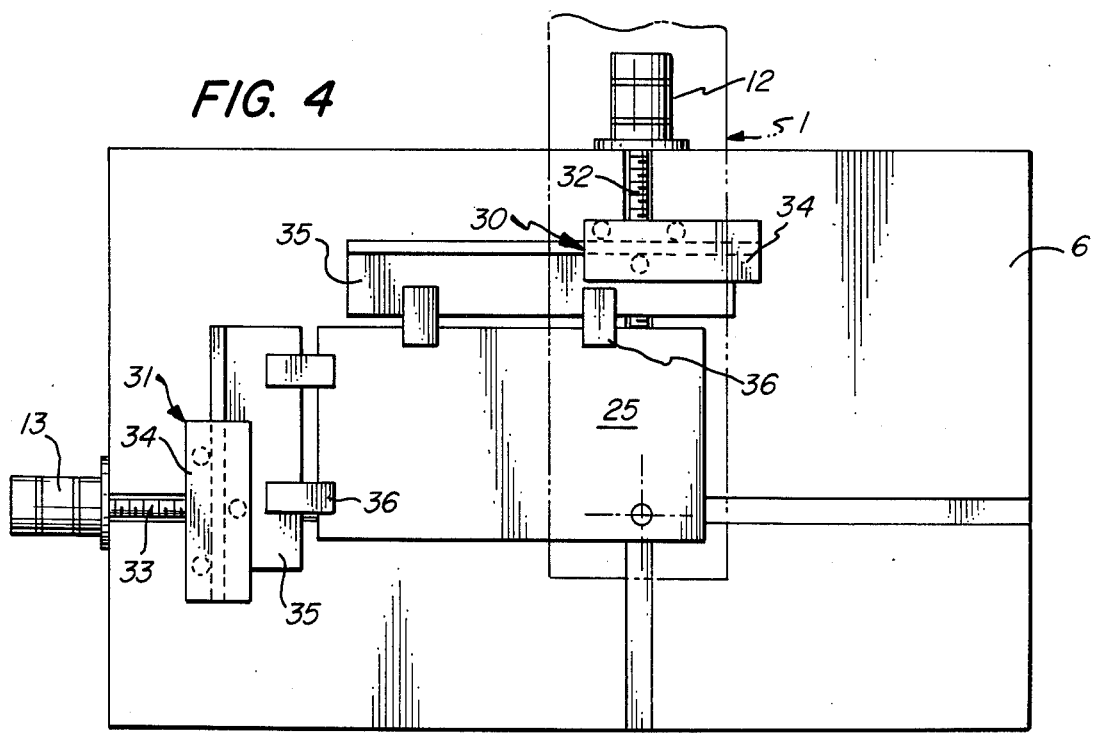

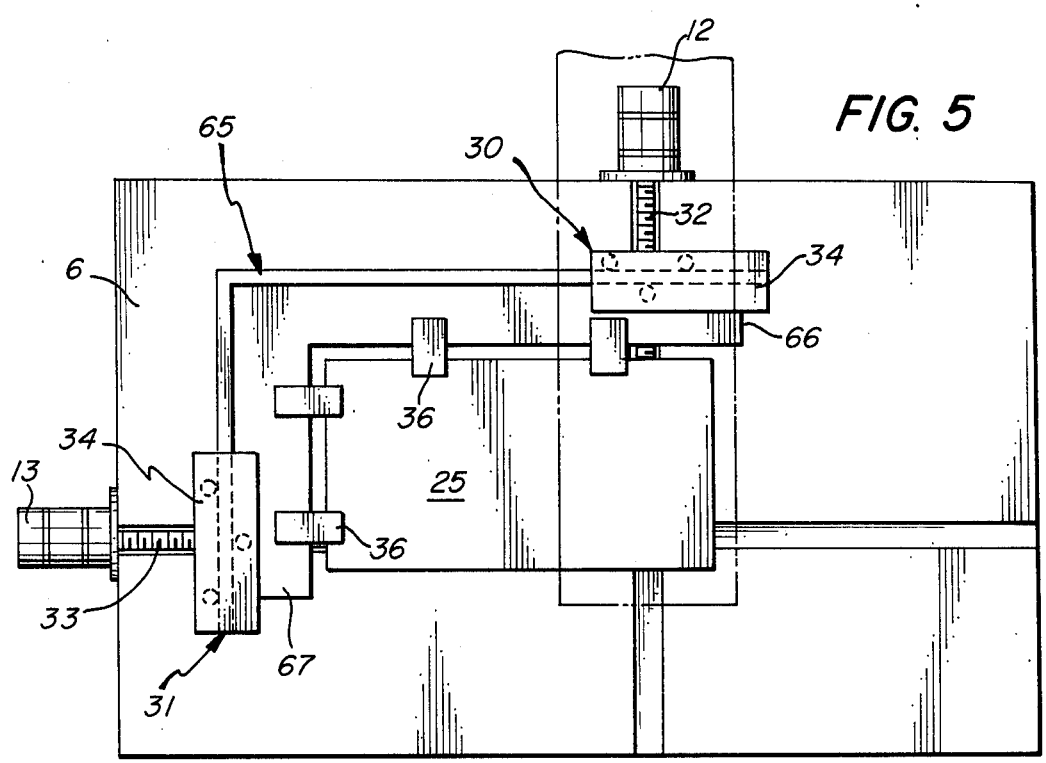
FIG. 5
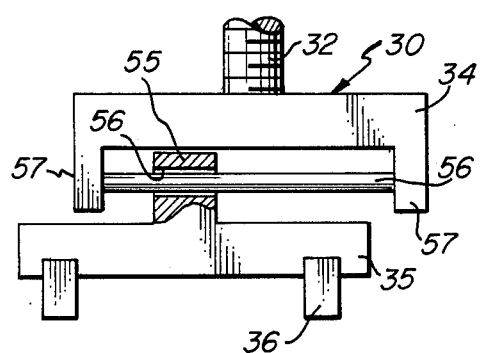
FIG. 6
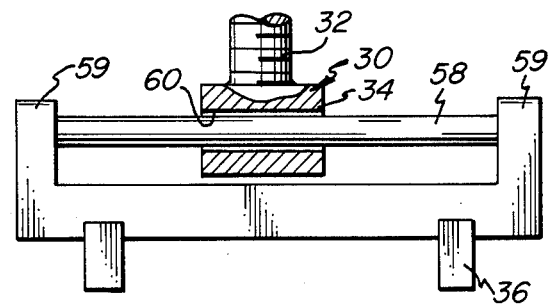
FIG. 7
FIG. 8

APPARATUS AND METHOD FOR CLAMPING AND POSITIONING WORKPIECE IN MACHINE TOOLS

CROSS-REFERENCE TO RELATED APPLICATION

The present application is a continuation in part of copending application Ser. No. 474,438 filed Mar. 11, 1983, now U. S. Pat. No. 4,619,448 granted Oct. 28, 1986.

BACKGROUND OF THE INVENTION

Coordinate guide and positioning systems are well known for the positioning of the workpiece in a wide variety of machine tools. Most of these mechanisms require relatively costly construction and control systems in order to achieve the desired precision location of the workpiece upon the worktable and the controlled movement thereof.

Prior to the development of automatic coordinate guide systems and even in some present machines which are of less costly and less complex character, there have been provided manually movable stops for the workpiece against which the workpiece is moved by the operator. Although such simple positioning mechanisms are sufficient to achieve the desired result, manipulation by hand is relatively difficult and labor intensive.

It is an object of the present invention to provide a novel machine tool having a relatively simple and effective guide and positioning mechanism for moving and guiding flat workpieces along X and Y axes.

It is also an object to provide such a machine tool wherein the guidance system is relatively economical and rugged in which the control system is relatively uncomplicated.

Another object is to provide such machine tool in which the workpiece is firmly clamped by simple and effective means to ensure its precise positioning as it is guided in its movement along the X and Y axes.

SUMMARY OF THE INVENTION

It has now been found that the foregoing and related objects can be readily obtained in a machine tool having a workpiece clamping and moving assembly for moving a workpiece in a horizontal plane and comprising a horizontal table having X and Y axes perpendicular to each other. A first workpiece guide assembly includes a stop member supported on the table for reciprocal movement along the X axis and means for clamping the associated workpiece to the stop member for movement therewith in either direction of reciprocal movement. The clamping means is movable relative to the stop member to allow the workpiece and stop member to move relative to each other. A second workpiece guide assembly is provided and includes a stop member supported on the table for reciprocal movement along the Y axis and is similarly provided with means for clamping the workpiece to the stop member for movement therewith. This clamping means is also movable relative to its stop member to allow relative movement of the stop member and workpiece. The machine tool also includes first and second drive means for the stop members of the first and second guide assemblies to effect reciprocal movement thereof along the X and Y axes, and control means for the first and second drive means to effect their operation independently of each other.

The workpiece clamping means comprises a clamp or claw and means mounting the clamp on the stop member. Operating means is provided for effecting movement of the clamp between an open position and a closed position to clamp the associated workpiece against a horizontally extending surface on the stop member. The control means generally controls the means for effecting movement of the clamp for automatically opening and closing it upon the workpiece. The control means also may include means for sensing whether the clamp is in the closed position and for preventing movement of the other guide means when the clamp is so closed and it is not slidable relative to the stop member.

Each of the stop members may desirably include vertically extending positioning pins for positively locating the associated workpiece on the stop members, and these locating pins may be adjustable vertically on the stop members so as to be movable into a position projecting above the bottom plane of the associated workpiece and to an inoperative position therebelow. These locating pins are desirably rotatable about a vertical axis so as to facilitate sliding movement of the workpiece thereby.

In a desirable embodiment of the invention, the clamp is supported on a base element, and thus the clamp may slide relative to the position of the base element which is moved by the drive means to allow movement of the workpiece relative to the base element of the stop member while it is still firmly clamped and guided thereby. Positioning means is also provided to lock the clamp in various positions on the base element. A preferred construction is one in which the clamp is supported on a intermediate stop element which in turn is slidably supported on the base element. The positioning means is a locking member which is movable between a locking position and a release position, and it is disposed on one of the stop and base elements and is movable into engagement with the other element. The preferred stop assembly includes a pair of clamps which are slidably supported on the base element. The control means effects operation of the positioning means.

The control means is desirably a numerical control system which will control not only the drive mechanisms for the guide assemblies but also the clamping means and, where employed, the mechanism for raising and lowering the positioning pins.

BRIEF DESCRIPTION OF THE DRAWINGS

FIG. 3 is a partially diagrammatic plan view of another embodiment of the clamping and guidance system of the present invention;

FIG. 4 is a view similar to FIG. 3 but showing the elements displaced along both X and Y axes from the position shown therein;

FIG. 5 is a view similar to FIG. 3 of still another embodiment of the present invention;

FIGS. 6-8 are fragmentary plan views in partial section of different sliding connections which may be utilized in the stop members of the present invention;

DETAILED DESCRIPTION OF THE ILLUSTRATED EMBODIMENTS

Figure 1:
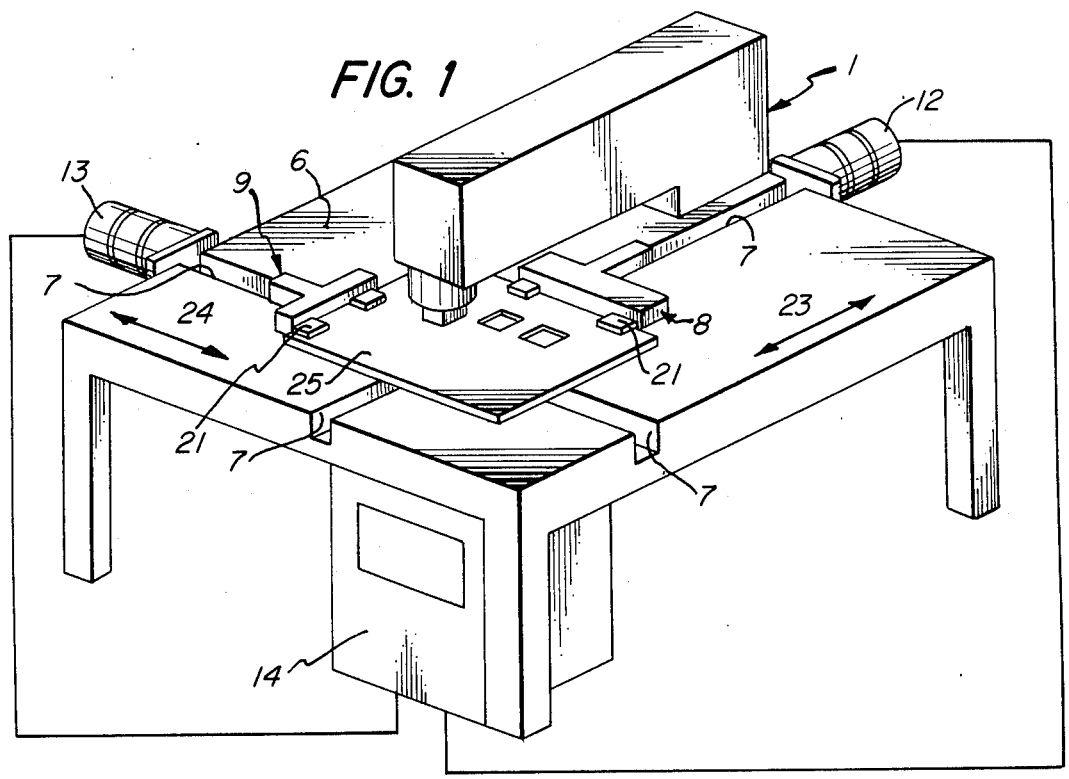
FIG. 1 is a partially diagrammatic perspective view of a machine tool embodying the novel workpiece moving and guidance system of the present invention.
Figure 2:
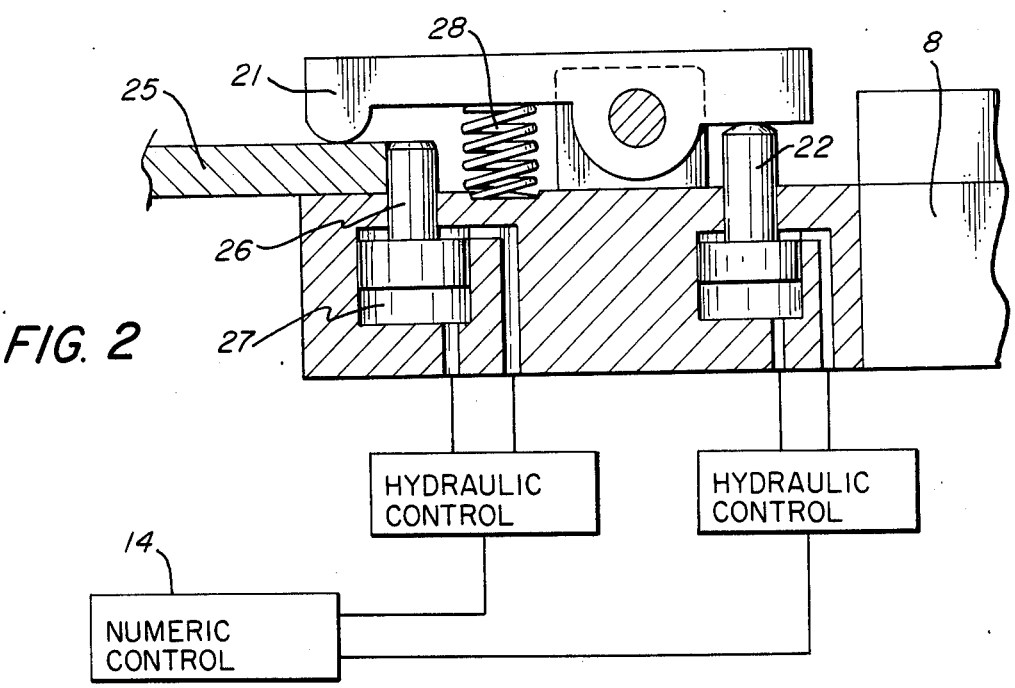
FIG. 2 is a partially diagrammatic fragmentary sectional view of one of the stop members showing the clamping mechanism, and the hydraulic mechanism for actuating the locating pins and clamping mechanism.

Turning first to FIGS. 1 and 2 of the attached drawings, the machine tool generally designated by the numeral 1 has a worktable or bed 6 provided with a pair of channels 7 extending at right angles to each other to define X and Y axes and in which are slidably seated the stop members generally designated by the numerals 8 and 9 which are reciprocated in the channels 7 by the independently actuatable drive motors 12 and 13.

The drive motors 12, 13 are connected to spindles (seen in FIG. 9) upon which the movable stop members 8, 9 are threadably engaged so that rotation of the motors in either direction will cause the stop members 8, 9 to move axially along the spindles.

When the spindle is rotated by the motor 12, the workpiece 25 will be moved along the axis defined by the spindle since it is clamped securely in the stop member 8. If the motor 13 is operated to drive the stop member 9 in either direction in its channel 7, the workpiece 25 is guided by the vertically extending pins 26 as it moves thereby. To reduce the frictional resistance to the sliding movement of the workpiece 25 past the pins 26, they are desirably supported on the stops 8, 9 for rotation about a vertical axis.

In the embodiment of FIGS. 1 and 2, the means for clamping the workpiece 25 to the stop members 8, 9 comprises clamping arms or claws 21 which are pivotably mounted on the stop members 8, 9. The claws 21 are biased into an open or workpiece releasing position by the compression springs 28 and are closed by movement upwardly of the piston 22 in response to the introduction of hydraulic fluid to the lower portion of the cylinder in which the piston 22 reciprocates. When the cylinder is depressurized, the spring 28 will open the claw 21. Ordinarily, the claw 21 of a stop member 8, 9 will be opened to receive a workpiece 25 and when the other stop member is actuated to move the workpiece 25 along the axis extending thereby.

In this embodiment, the stop members 8, 9 include vertically extending positioning pins 26 which provide means for precisely positioning the workpiece 25 when it is first engaged, as is seen in FIG. 2. After the claw 21 has been actuated to firmly clamp the workpiece 25, the pins 26 may be moved downwardly by suitable movement means for effecting vertical movement of the pins. In the illustrated embodiment, this vertical movement of the pins is effected by piston/cylinder action of a hydraulic mechanism wherein the downward movement is effected by introduction of hydraulic fluid under pressure to the upper portion of the cylinder 27. By control of the hydraulic pressure on the opposite sides of the piston, the vertical height of projection of the pins 26 above the horizontal support surface may be varied. Once the claws 21 have been engaged so that the workpiece 25 is firmly secured, the pins 26 may be retracted below the plane of the horizontal support surface of the stop members 8, 9 so that the workpiece 25 may freely slide thereon in response to the motion induced by the other stop member.

To control the drive motors 12 and 13 and the hydraulic mechanisms for the pistons 22 and pins 26, a numerical control system 14 is provided. In the embodiment of FIGS. 1 and 2, the numerical control system 14 controls the operation of drive motors 12 and 13, the claw 21, and stop members 8 and 9. In operation, the claw 21 must be released to effect the repositioning of the workpiece 25 and it is thereafter reengaged.

In the embodiment of FIGS. 3 and 4, the stop members generally designated by the numerals 30, 31 are mounted on spindles 32, 33 for reciprocal movement along the perpendicular X and Y axes, by the motors 12, 13. The stop members 30, 31 each comprise a base element 34 secured to the spindles 32, 33, an intermediate slide element 35 slidably seated on the base element 34, and a pair of clamps 36 spaced along the slide element 35. As a result, the workpiece 25 can be securely clamped in both pairs of clamps 36 and moved along one axis by one stop member 30 or 31 with the intermediate slide element 35 of the other stop member sliding therewithin along that axis.

Figure 9:
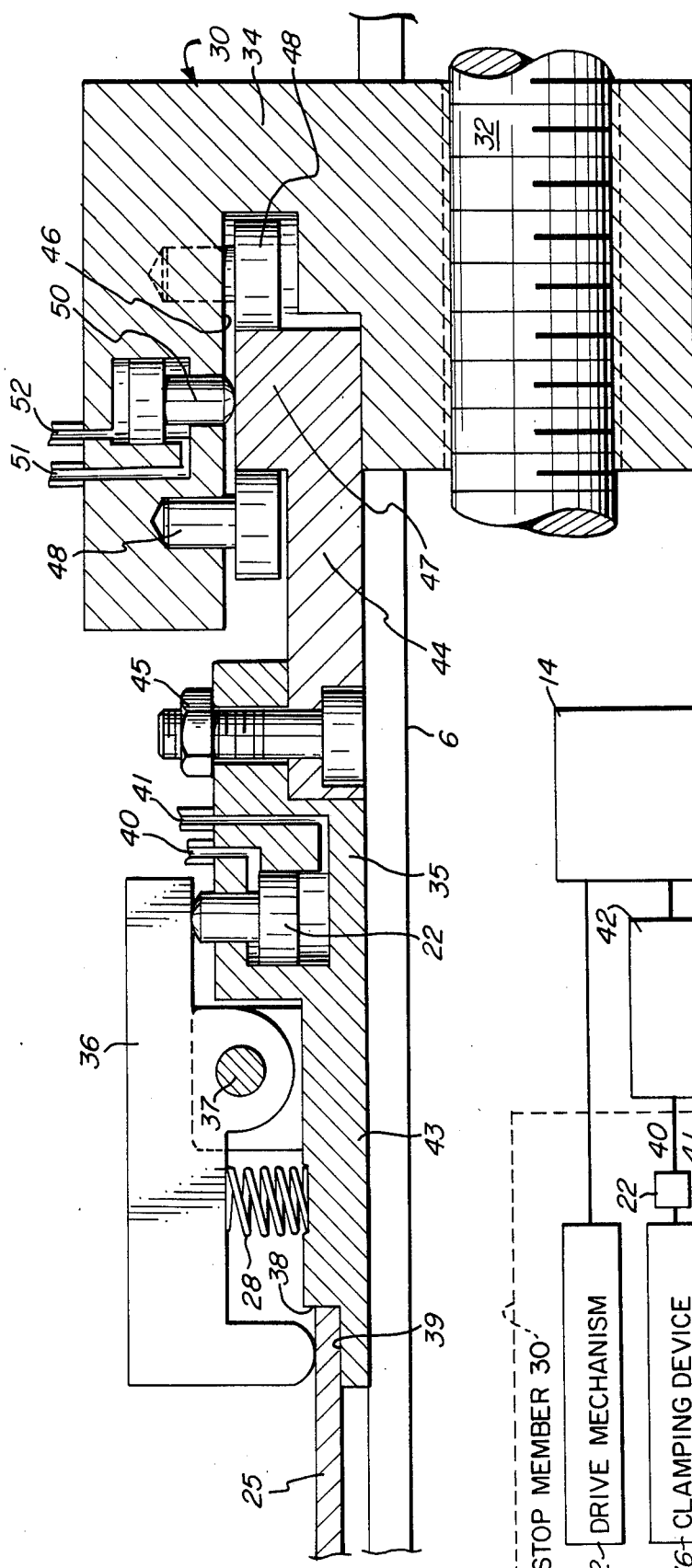
FIG. 9 is a fragmentary sectional view to an enlarged scale of a stop member in the embodiment of FIGS. 3 and 4.
Figure 10:
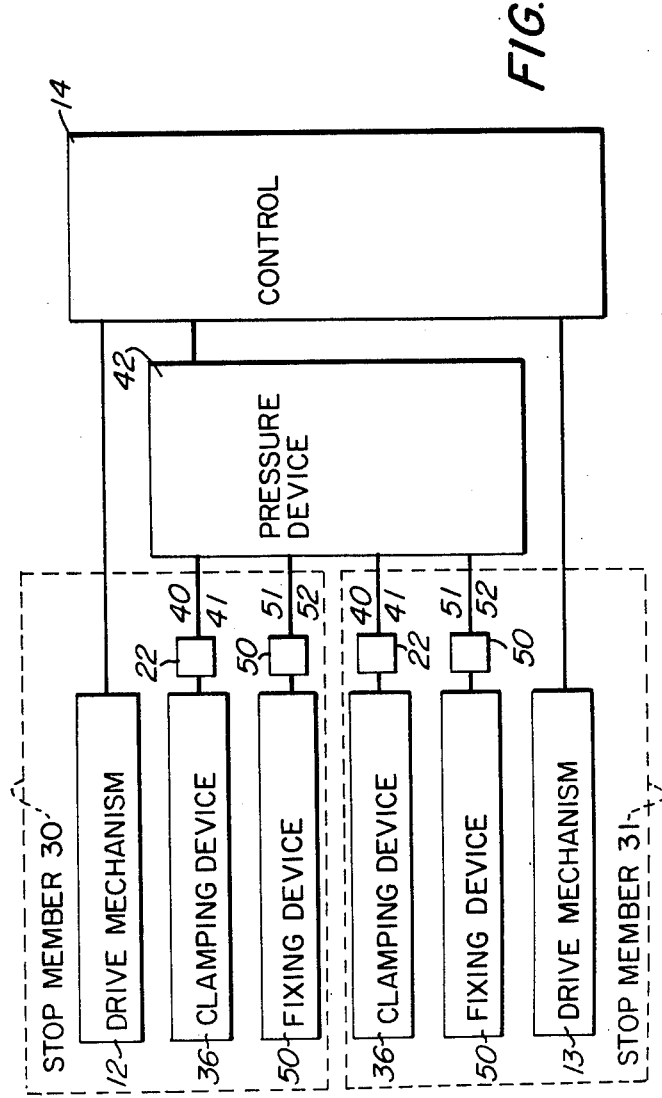
FIG. 10 is a diagrammatic view of the hydraulic and motor control circuit 5.

As seen in FIGS. 9 and 10, the clamp 36 is mounted for pivotal movement about a horizontal axis on the pin 37, and is biased into an open position by the compression spring 28. The piston 22 pivots the clamp 36 downwardly against the top surface of the workpiece 25 to secure it firmly against both the vertical shoulder 38 and horizontal surface 39 of the intermediate slide element 35. Actuation of the piston 22 is effected by hydraulic fluid supplied through one of the conduits 40, 41 from the hydraulic pump 42 in response to signals from the control system 14.

As also seen in FIG. 9, the intermediate slide element 35 is comprised on outer member 43 and an inner member 44 which are secured in assembly by fasteners 45. The inner member 44 extends into a recess 46 in the base element 34 and has an upstanding flange 47 which is slidably captured between guide rollers 48 as the slide element 35 slides on the horizontal surface 49 of the base element 34. One or more pistons 50 are provided in the overlying portion of the base element 34 and are movable into the locking or clamping position seen in FIG. 9 to prevent sliding motion of the sliding element 35 relative to the base element 34. Movement of the pistons 50 is effected by hydraulic fluid supplied through the conduits 51, 52 from the pump 42 in response to signals from the computer control system 14.

In the embodiment of FIG. 5, there is provided an L-shaped intermediate slide element generally designated by the numeral 65 which has a pair of slide leg portions 66, 67 seated in the base elements 34 of the stop members 30, 31. As will be appreciated, this type of device does not rely upon the workpiece 25 to transmit the force necessary to effect sliding within the passive or stationary stop member 30, 31. This is advantageous in handling thin sheet stock which might buckle or bend. The same result can be obtained by a rigid coupling element attached between the separate slide elements 35 of the embodiment of FIGS. 5 and 6, and this can be disconnected and connected as desired.

In FIGS. 6 and 7, two alternate structures are shown for slidably supporting the slide element 35 on the base element 34. In FIG. 8, the slide element 35 has an arm 55 with a bore 56 to provide a slidable connection as the rod 56 extending between the side arms 57 of the base element 34. In FIG. 7, the slide bar 58 is provided between the arms 59 on the slide element 35, and the base element 34 has a bore 60 through which it extends.

In the embodiment of FIG. 8, the intermediate slide element 35 comprises a slide bar which extends between the arms 62 on the base element 34, and the schematically illustrated clamping device 70 has a bore 63 through which the slide bar extends.

In each of these embodiments, there is provided a hydraulically accelerated piston or other suitable means (not shown) for fixing the clamp 36 (FIG. 10), or the slide element 35 with the clamps 36 thereon (FIG. 9) and clamping device 70 (FIG. 8) in a predetermined position relative to the spindle 32.

Thus, it can be seen from the foregoing specification and attached drawings that the novel guidance system of the present invention is relatively simple and effective, is rugged and will provide precise positioning of the workpiece. This system may be fabricated at relatively low cost to provide a long-lived assembly.

Having thus described the invention, what is claimed is:

1. A machine tool having a workpiece clamping and moving assembly for moving a workpiece in a horizontal plane and comprising:
   A. a horizontal table having X and Y axes perpendicular to each other;
   B. first and second workpiece guide assemblies each including a stop member supported on said table for reciprocal movement along an axis of said table and means for clamping an associated workpiece on each stop member for movement therewith in the same direction as said stop member during its reciprocal movement, said clamping means of each guide assembly being movable relative to said stop member of that guide assembly independently of any movement of said stop member of that guide assembly to effect clamping of an associated workpiece on said stop member of its guide assembly, said stop member and clamping means of said first guide assembly being movable along said X-axis and said stop member and said clamping means of said second guide assembly being movable along said Y-axis, said stop members of each of said workpiece guide assemblies being configured to provide horizontally extending surfaces and vertically extending surfaces for supporting and aligning the associated workpiece thereon for movement about said table, said workpiece clamping means of each of said workpiece guide assemblies comprising a clamp, means mounting the clamp on said stop member, and means for effecting movement of said clamp on said stop member between an open position and a closed position to clamp the associated workpiece against said vertical and horizontally extending surfaces on said stop member;
   C. first and second drive means for said stop members of said first and second guide assemblies respectively for effecting reciprocal movement thereof along said X and Y axes, said reciprocal movement of each of said stop members producing concurrent movement of an associated workpiece clamped on said stop member by the associated clamping means of that guide assembly to thereby effect controlled movement of an associated workpiece along said X and Y axes; and
   D. control means for said first and second drive means for effecting operation thereof independently of each other.

2. The machine tool in accordance with claim 1 wherein said control means controls said means for effecting movement of said clamp for automatically opening and closing said clamp.

3. The machine tool in accordance with claim 1 wherein each of said stop members includes vertically extending positioning pins for positively locating the associated workpiece on said stop member and providing a guide surface.

4. The machine tool in accordance with claim 3 wherein said locating pins are adjustable vertically of said stop members so as to be movable into a position projecting above the bottom plane of the associated workpiece and into a position therebelow.

5. The machine tool in accordance with claim 4 wherein said positioning pins on said stop member are rotatable about a vertical axis.

6. The machine tool in accordance with claim 1 in which said control means is a numeric control system.

7. The machine tool in accordance with claim 4 wherein said locating pins are movable by movement means controlled by said control means.

8. The machine tool in accordance with claim 1 wherein said clamping means is slidably supported on a base element of said stop member for movement relative thereto in the direction of its movement along its axis of reciprocation and said clamping means includes a stop element providing vertically extending surfaces for supporting and aligning the workpiece, and wherein said stop members include positioning means for locking the clamping means in various positions relative to said base elements.

9. The machine tool in accordance with claim 8 wherein said stop element is slidably supported on said base element.

10. The machine tool in accordance with claim 9 wherein said positioning means comprises a locking member movable between a locking position and a release position, said locking member being disposed on one of said base and stop elements and being movable into engagement with the other of said elements.

11. The machine tool in accordance with claim 8 wherein said control means controls said positioning means and said clamp movement means.

12. The machine tool in accordance with claim 8 wherein a pair of clamps are provided on each of said stop members.

13. A machine tool having a workpiece clamping and moving assembly for moving a workpiece in a horizontal plane and comprising:
   A. a horizontal table having X and Y axes perpendicular to each other;
   B. first and second workpiece guide assemblies each including a stop member supported on said table for reciprocal movement along an axis of said table and means for clamping an associated workpiece on each stop member for movement therewith in the same direction as said stop member during its reciprocal movement, said clamping means of each guide assembly being movable relative to said stop member of that guide assembly independently of any movement of said stop member of that guide assembly to effect clamping of an associated workpiece on said stop member of its guide assembly, said stop member and clamping means of said first guide assembly being movable along said X-axis and said stop member and said clamping means of said second guide assembly being movable along said Y-axis, said stop members of each of said workpiece guide assemblies being configured to provide horizontally extending surfaces and vertically extending surfaces for supporting and aligning the associated workpiece thereon for movement about said table, said workpiece clamping means of each of said workpiece guide assemblies comprising a base element, a clamp slidably supported on said base element for movement relative thereto in the direction of movement of said stop member, said clamping means also including a stop element providing said vertically extending surfaces for supporting and aligning the workpiece, said stop members further including positioning means for locking said clamping means in various positions relative to said base element and means for effecting movement of said clamp on said base element between an open position and a closed position to clamp the associated workpiece against said vertical and horizontally extending surfaces on said stop member;

C. first and second drive means for said stop members of said first and second guide assemblies respectively for effecting reciprocal movement thereof along said X and Y axes, said reciprocal movement of one of said stop members producing concurrent movement of an associated workpiece clamped on said stop member by the associated clamping means of that guide assembly to thereby effect controlled movement of an associated workpiece along said X and Y axes, the positioning means of the other guide assembly being in an unlocking position to permit sliding motion of the clamping means and workpiece relative to that guide assembly; and D. control means for said first and second drive means for effecting operation thereof independently of each other, said control means also controlling said positioning means and said clamp movement means.

14. The machine tool in accordance with claim 13 wherein said positioning means comprises a locking member movable between a locking position and a release position, said locking member being disposed on one of said base and stop elements and being movable into engagement with the other of said elements.

15. The machine tool in accordance with claim 13 wherein a pair of clamps are provided on each of said stop members.

* * * * *